(12) United States Patent
Takahashi et al.

(10) Patent No.: US 9,806,436 B2
(45) Date of Patent: Oct. 31, 2017

(54) TERMINAL BASE HAVING AN ELCTRICAL CONNECTOR TO CONNECT A COIL-SIDE TERMINAL OF AN ELCTRIC MOTOR TO AN INVERTER-SIDE TERMINAL OF AN INVERTER

(71) Applicant: AISIN AW CO., LTD., Anjo-shi, Aichi-ken (JP)

(72) Inventors: Katsutoshi Takahashi, Nisio (JP); Hiroyuki Fujioka, Okazaki (JP)

(73) Assignee: AISIN AW CO., LTD., Anjo (JP)

( * ) Notice: Subject to any disclaimer, the term of this patent is extended or adjusted under 35 U.S.C. 154(b) by 0 days.

(21) Appl. No.: 15/503,525

(22) PCT Filed: Jul. 24, 2015

(86) PCT No.: PCT/JP2015/071090
§ 371 (c)(1),
(2) Date: Feb. 13, 2017

(87) PCT Pub. No.: WO2016/035476
PCT Pub. Date: Mar. 10, 2016

(65) Prior Publication Data
US 2017/0229788 A1   Aug. 10, 2017

(30) Foreign Application Priority Data
Sep. 2, 2014   (JP) .................. 2014-178039

(51) Int. Cl.
*H02K 5/22* (2006.01)
*H01R 4/30* (2006.01)
*H01R 4/70* (2006.01)

(52) U.S. Cl.
CPC .............. *H01R 4/302* (2013.01); *H01R 4/70* (2013.01); *H02K 5/225* (2013.01)

(58) Field of Classification Search
CPC . H01R 4/30; H01R 4/70; H01R 4/302; H02K 5/00; H02K 5/02; H02K 5/04; H02K 5/05; H02K 5/22; H02K 5/225
(Continued)

(56) References Cited

U.S. PATENT DOCUMENTS 8,344,564 B2 * 1/2013 Yoshida ............... H02K 5/22
310/112
9,112,397 B2 * 8/2015 Kobayashi ............ H01R 9/24
(Continued)

FOREIGN PATENT DOCUMENTS

JP   2008-301572 A   12/2008
JP   2009-064572 A    3/2009
(Continued)

OTHER PUBLICATIONS

Oct. 27, 2015 Search Report issued in International Patent Application No. PCT/JP2015/071090.

*Primary Examiner* — Chandrika Prasad
(74) *Attorney, Agent, or Firm* — Oliff PLC

(57) ABSTRACT

A terminal base that is disposed on an electrical connection path between a coil of an electric motor accommodated inside a case and an inverter disposed outside the case and connects a coil-side terminal serving as a terminal on a coil side to an inverter-side wiring member serving as a wiring member on an inverter side, the terminal base including: a connector that electrically connects the inverter-side wiring member and the coil-side terminal; a fastener that fixes the coil-side terminal to a first terminal serving as one terminal of the connector; and a terminal base main body that holds the connector.

7 Claims, 5 Drawing Sheets

(58) Field of Classification Search
USPC .............................. 439/804, 810; 310/71, 89
See application file for complete search history.

(56) References Cited

U.S. PATENT DOCUMENTS

| | | | | |
|---|---|---|---|---|
| 9,446,657 | B2* | 9/2016 | Takahashi | B60L 15/007 |
| 2011/0065298 | A1* | 3/2011 | Tanae | H01R 31/08 |
| | | | | 439/189 |
| 2012/0319513 | A1* | 12/2012 | Okamoto | H01R 13/5202 |
| | | | | 310/71 |
| 2015/0333604 | A1* | 11/2015 | Hattori | F04B 35/04 |
| | | | | 310/68 D |

FOREIGN PATENT DOCUMENTS

| | | |
|---|---|---|
| JP | 2011-146230 A | 7/2011 |
| JP | 2012-256573 A | 12/2012 |

* cited by examiner

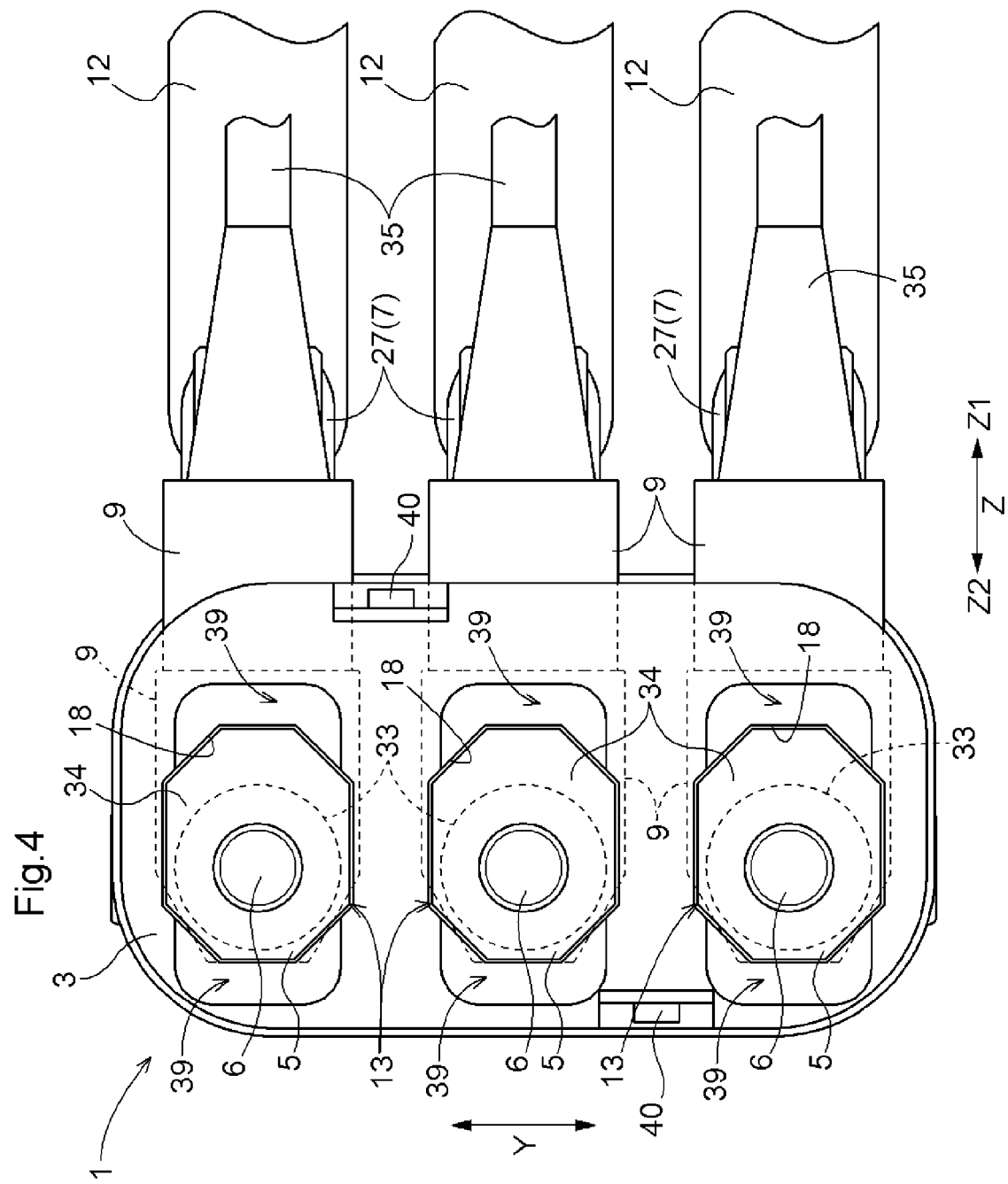

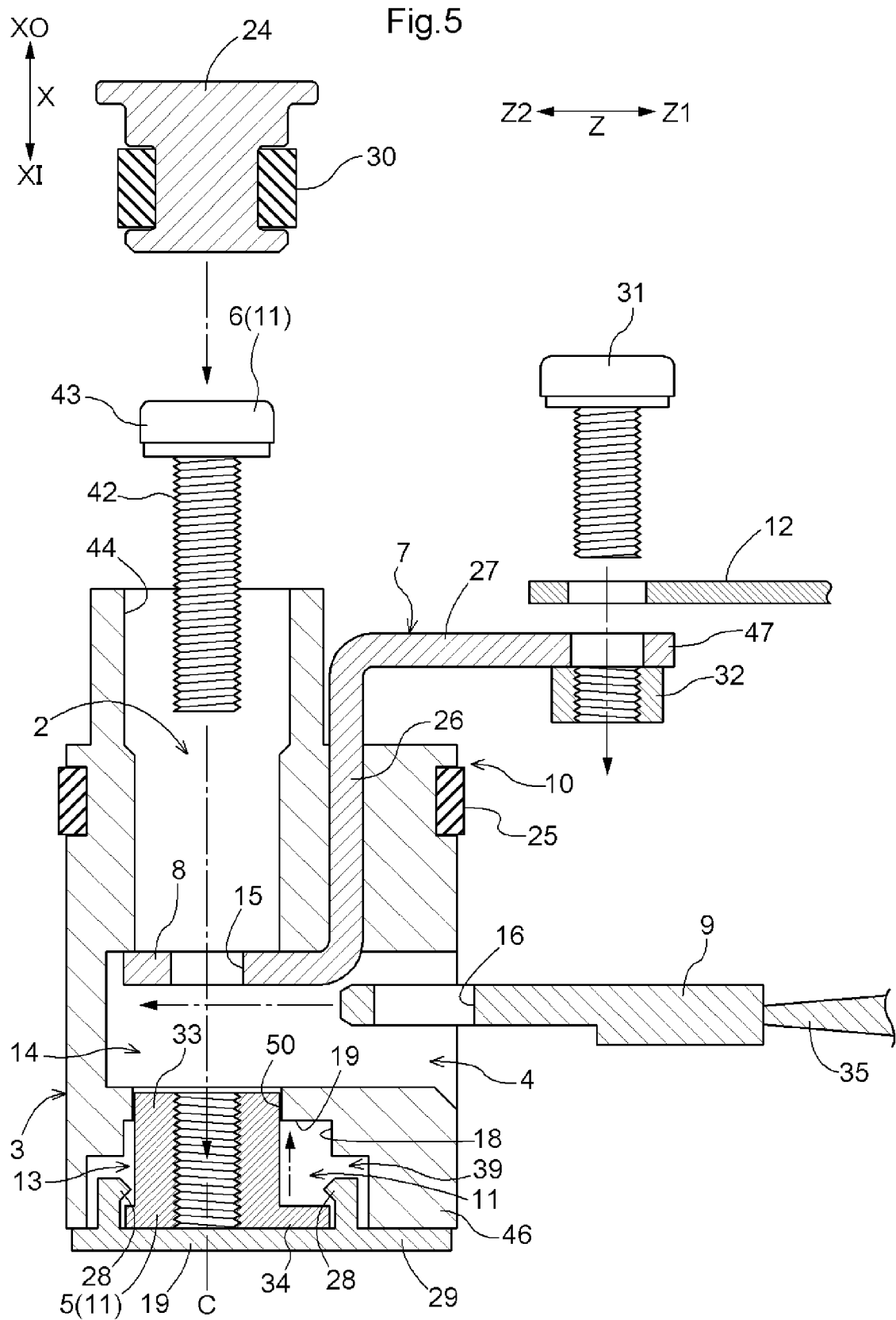

TERMINAL BASE HAVING AN ELCTRICAL CONNECTOR TO CONNECT A COIL-SIDE TERMINAL OF AN ELCTRIC MOTOR TO AN INVERTER-SIDE TERMINAL OF AN INVERTER

BACKGROUND

The present disclosure relates to a terminal base for connecting a coil-side terminal of an electric motor accommodated inside a case member and an inverter-side wiring member disposed outside the case member.

Japanese Patent Application Publication No. 2008-301572 (JP 2008-301572 A) discloses a terminal base disposed on an electrical connection path between a coil of an electric motor accommodated inside a case member and an inverter disposed outside the case member. The terminal base connects a coil-side terminal serving as a terminal on the coil side to an inverter-side wiring member serving as a wiring member on the inverter side. According to the technique of Patent Japanese Patent Application Publication No. 2008-301572, the terminal base is disposed inside the case member. Therefore, when fixing the coil-side terminal to the inverter-side wiring member, it is necessary to remove a detachable portion (18) serving as a part of the case member, insert a tool from the outside to the inside of the case member via the detachable portion (18), and fasten a bolt or the like disposed inside the case member. That is, according to the, technique of Japanese Patent Application Publication No. 2008-301572, an opening (a so-called service hole) for performing connection work inside the case member needs to be provided in the case member, separately from a hole for the wiring member connecting the electric motor and the inverter. Furthermore, a lid member for closing the opening also needs to be provided. This requires changing the shape of the case member so as to, for example, form the opening in a position that allows insertion of a tool, and imposes more constraints on the layout. This also increases the size, the number of components, the weight of the case member, and man-hours.

SUMMARY

In view of the above, it is desired to provide a terminal base that allows a coil-side terminal to be connected to an inverter-side wiring member, from the outside of a case member.

In view of the above, according to one exemplary aspect, there is provided a terminal base that is disposed on an electrical connection path between a coil of an electric motor accommodated inside a case and an inverter disposed outside the case and connects a coil-side terminal serving as a terminal on a coil side to an inverter-side wiring member serving as a wiring member on an inverter side, the terminal base including: a connector that electrically connects the inverter-side wiring member and the coil-side terminal; a fastener that fixes the coil-side terminal to a first terminal serving as one terminal of the connector; and a terminal base main body that holds the connector, wherein: the fastener includes an internal screw and an external screw that is threaded into the internal screw; the terminal base main body includes an attachment that is attached to the case, a screw insertion hole in which the external screw inserted from the outside to the inside of the case is disposed, a coil terminal insertion hole which is disposed inside the case and into which the coil-side terminal is inserted, and an internal screw holder that holds the internal screw, the coil terminal insertion hole is formed to intersect with the screw insertion hole; the first terminal is disposed at an intersection between the coil terminal insertion hole and the screw insertion hole; direction parallel to a rotation axis of the external screw disposed in the screw insertion hole is defined as an axial direction, and a side directed to the inside of the case in the axial direction is defined as an axially inner side; the internal screw holder is formed in a portion of the screw insertion hole, on the axially inner side with respect to the intersection; and then the external screw extends through a through hole formed in the first terminal and a through hole formed in the coil-side terminal and is threaded into the internal screw, the coil-side terminal is fixed to the first terminal.

With this configuration, when the external screw extends through the through hole formed in the first terminal and the through hole formed in the coil-side terminal and is threaded into the internal screw, the coil-side terminal is fixed to the first terminal. The external screw is inserted into the screw insertion hole from the outside to the inside of the case. That is, with this configuration, the terminal base allows the coil-side terminal to the connected to the inverter-side wiring member, from the outside of the case. Accordingly, there is no need to provide an opening (a service hole) described in Japanese Patent Application Publication No. 2008-301572 in the case for connection. In other words, only the hole for the wiring member between the electric motor and the inverter needs to be provided in the case. This increases the degree of freedom in the shape of the case, and makes it less likely to increase the size and the weight of the case.

BRIEF DESCRIPTION OF THE DRAWINGS

FIG. 4 is a side view illustrating the terminal base as viewed toward an axially outer side, wherein a lid member is not attached to a terminal base main body.

FIG. 5 is an exploded perspective view illustrating the terminal base.

DETAILED DESCRIPTION OF EMBODIMENTS

1. Embodiment

Figure 1:
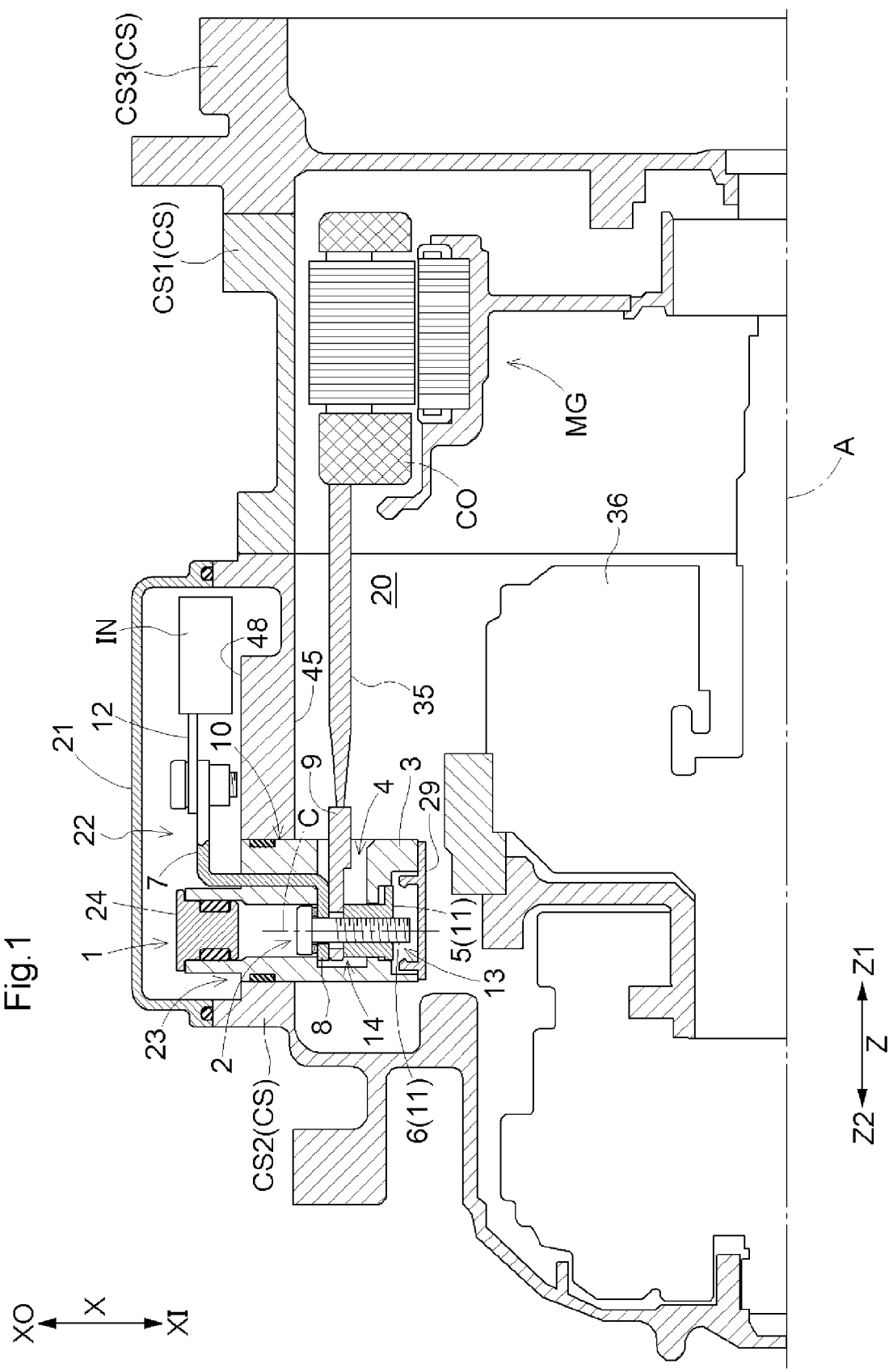
FIG. 1 is a cross-sectional view illustrating a terminal base attached to a case member.
Figure 2:
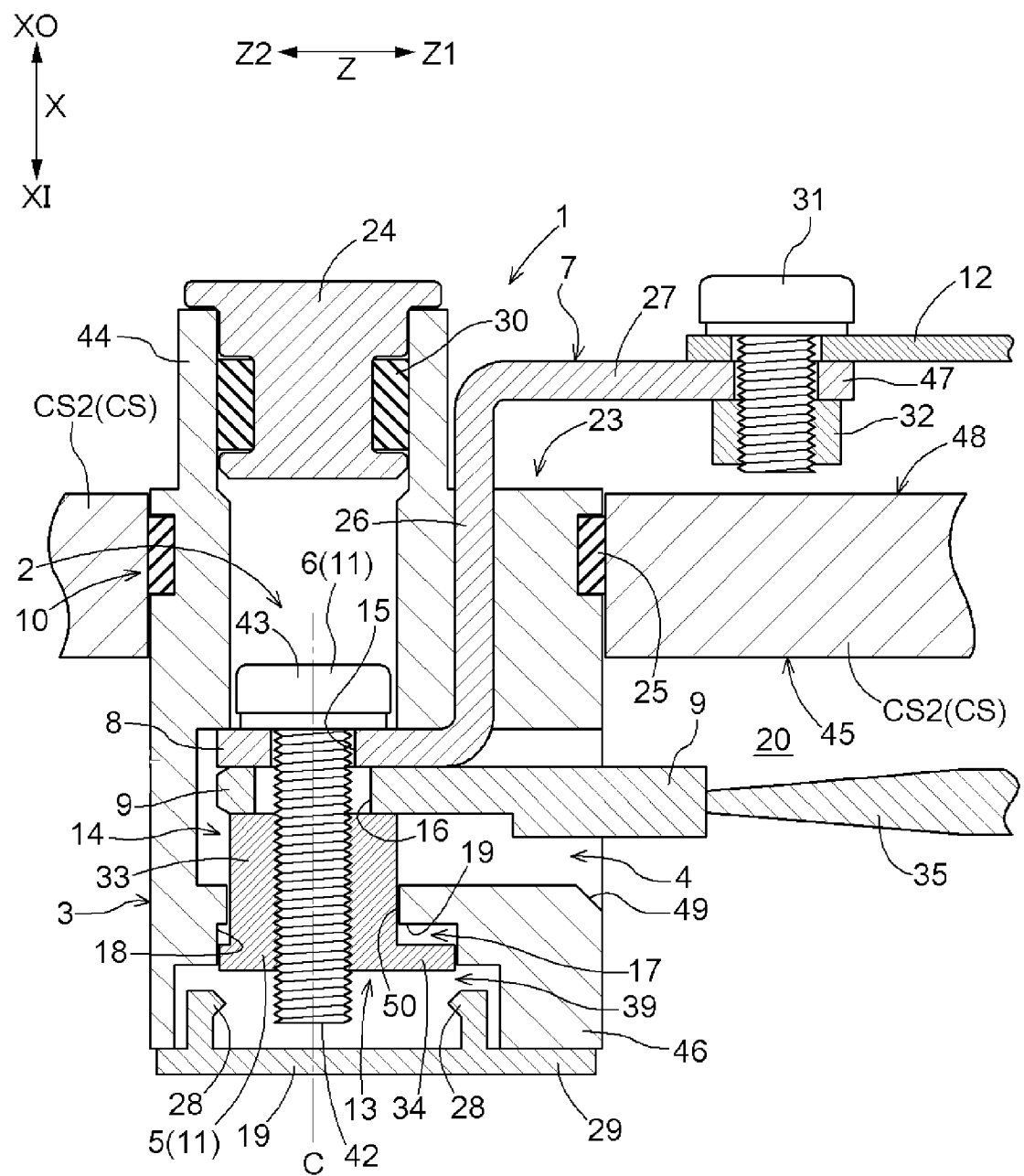
FIG. 2 is a cross-sectional view illustrating a main part of the terminal base attached to the case member.
Figure 3:
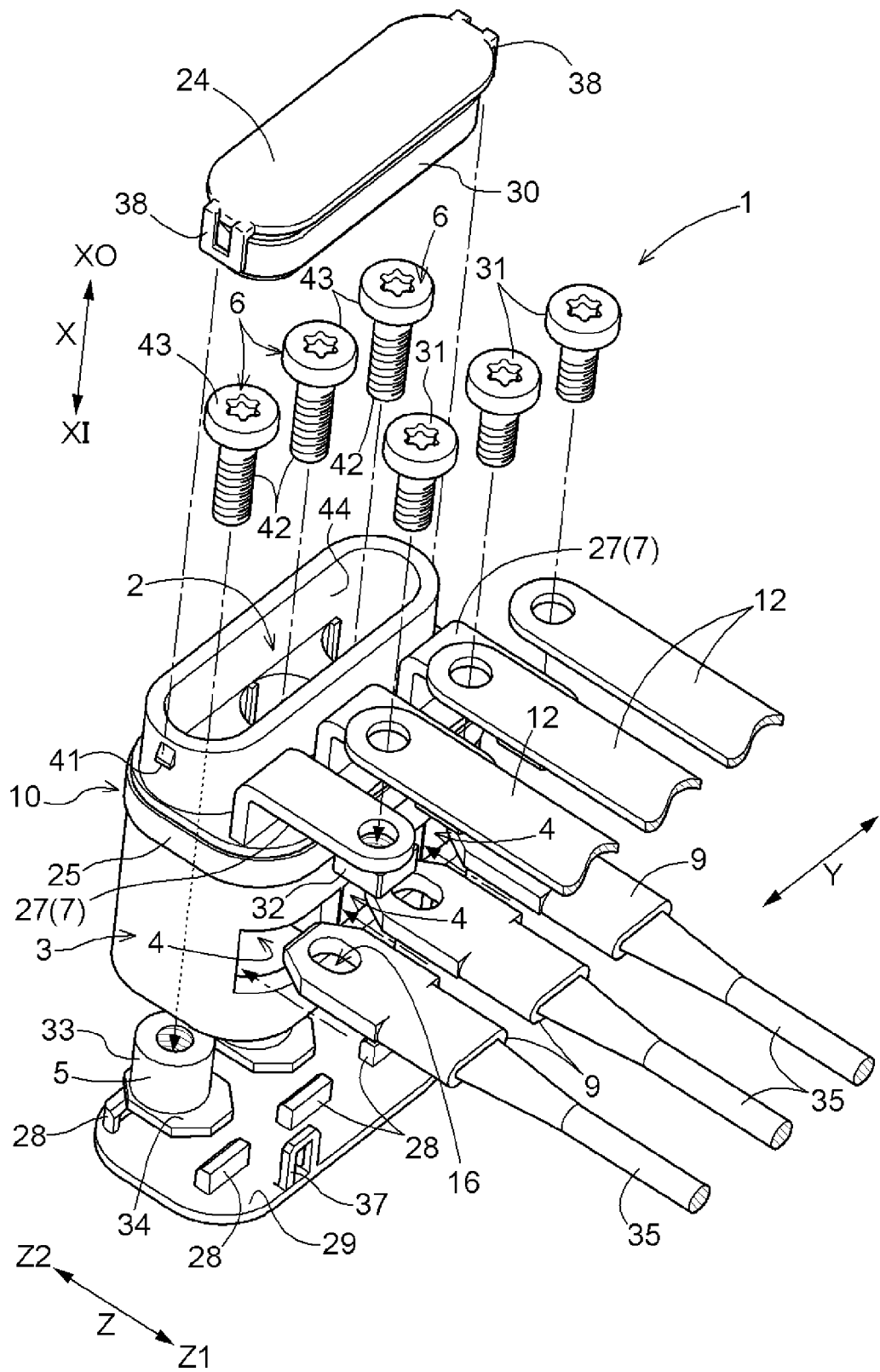
FIG. 3 is an exploded perspective view illustrating the terminal base.

Hereinafter, an embodiment of a terminal base 1 will be described with reference to the drawings. FIG. 1 is a cross-sectional view illustrating a drive device with the terminal base 1 attached thereto; FIG. 2 is a cross-sectional view illustrating the terminal base 1 attached to a case member CS (i.e., case); FIG. 3 is an exploded perspective view illustrating the terminal base 1; FIG. 4 is a side view illustrating the terminal base 1 as viewed toward an axially outer side XO, wherein a lid member 29 is not attached to a terminal base main body 3; and FIG. 5 is an exploded perspective view illustrating the terminal base 1.

As illustrated in FIGS. 1 and 2, the terminal base 1 is disposed on an electrical connection path between a coil CO of an electric motor MG accommodated inside the case member CS and an inverter IN disposed outside the case member CS. The terminal base 1 connects a coil-side terminal 9 serving as a terminal on the coil CO side to an inverter-side wiring member 12 serving as a wiring member on the inverter IN side.

The terminal base 1 includes a connecting member (i.e., connector) that electrically connects the inverter-side wiring member 12 and the coil-side terminal 9, a fastening member 11 (i.e., fastener) that fixes the coil-side terminal 9 to a first terminal 8 serving as one terminal of the connecting member 7, and the terminal base main body 3 that holds the connecting member 7. The fastening member 11 includes an internal screw member 5 (i.e., internal screw), and an external screw member 6 (i.e., external screw) that is threaded into the internal screw member 5.

The terminal base main body 3 includes an attachment portion 10 (i.e., attachment) that is attached to the case member CS, a screw insertion hole 2 in which the external screw member 6 inserted from the outside to the inside of the case member CS is disposed; a coil terminal insertion hole 4 which is disposed inside the case member CS and into which the coil-side terminal 9 is inserted; and an internal screw holding portion 13 that holds the internal screw member 5.

The coil terminal insertion hole 4 is formed to intersect with the screw insertion hole 2. That is, the coil terminal insertion hole 4 and the screw insertion hole 2 intersect and communicate with each other. The first terminal 8 of the connecting member 7 is disposed at an intersection 14 between the coil terminal insertion hole 4 and the screw insertion hole 2. The internal screw holding portion 13 is formed in a portion of the screw insertion hole 2, on an axially inner side XI with respect to the intersection 14.

When the external screw member 6 extends through a through hole 15 formed in the first terminal 8 and a through hole 16 formed in the coil-side terminal 9 and is threaded into the internal screw member 5, the coil-side terminal 9 is fixed to the first terminal 8. Thus, the first terminal 8 and the coil-side terminal 9 can be held and connected by the external screw member 6 and the internal screw member 5 from the axially opposite sides.

An axial direction X is a direction parallel to a rotation axis C of the external screw member 6 disposed in the screw insertion hole 2 and threaded in the internal screw member 5. Note that the rotation axis C of the external screw member 6 coincides with the axis of a threaded hole of the internal screw member 5 held in the internal screw holding portion 13. The axially inner side XI is a side directed to the inside of the case member CS in the axial direction X. The axially outer side XO is a side directed to the outside of the case member CS in the axial direction X, and is the side opposite to the axially inner side XI.

The direction in which the coil terminal insertion hole 4 extends is referred to as a hole extending direction Z. The side directed toward the coil CO in the hole extending direction Z is referred to as a hole-extending-direction first side Z1. The side directed away from the coil CO in the hole extending direction Z and opposite to the hole-extending-direction first side Z1 is referred to as a hole-extending-direction second side Z2. Furthermore, the direction orthogonal to the axial direction X and the hole extending direction Z is referred to as an orthogonal direction Y (see FIG. 3).

In the present embodiment, the terminal base 1 is a terminal base for the three-phase alternating current electric motor MG including three coil-side terminals 9. As illustrated in FIGS. 3 and 4, the terminal base 1 includes three connecting members 7 and fastening members 11. Furthermore, the terminal base main body 3 includes three screw insertion holes 2 into which the external screw members 6 of the respective fastening members 11 are inserted, three coil terminal insertion holes 4 into which the respective coil-side terminals 9 are inserted, and three internal screw holding portions 13 that hold the internal screw members 5 of the respective fastening members 11. In the present embodiment, the three external screw members 6 (screw insertion holes 2) are arranged parallel to each other and aligned in the orthogonal direction The three coil-side terminals 9 (coil terminal insertion holes 4) are also arranged parallel to each other and aligned in the orthogonal direction Y, at the same pitch as the arrangement pitch of the three external screw members 6. Accordingly, the direction in which the three external screw members 6 (screw insertion holes 2) are aligned and the direction in which the coil-side terminals 9 (the coil terminal insertion holes 4 are aligned coincide with the orthogonal direction Y.

<Attaching to Case Opening 23>

The terminal base 1 is attached to the case member CS by the attachment portion 10. In the present embodiment, as illustrated in FIGS. 1 and 2, the attachment portion 10 is attached to a case opening 23 formed as an opening in the case member CS, and includes a seal portion (a seal member 25 described below) that seals the gap between the attachment portion 10 and the case opening 23. Accordingly, the terminal base 1 is attached to the case member CS to seal the case opening 23.

In the present embodiment, as illustrated in FIG. 1, the case member CS includes a first case member CS1 (i.e., first case) that accommodates the electric motor MG, and a second case member CS2 (i.e., second case) that is connected to the first case member CS1. The first case member CS1 is disposed on the hole-extending-direction first side Z1 of the second case member CS2. The case member CS further includes a third case member CS3 that is connected to the first case member CS1. The third case member CS3 is disposed on the hole-extending-direction first side Z1 of the first case member CS1.

The first case member CS1 and the second case member CS2 are connected with each other, thereby forming an internal space 20. Each coil-side terminal 9 extends in the internal space 20 from the first case member CS1 side to the second ease member CS2 side. More specifically, a coil connection conductor 35 extends toward the hole-extending-direction second side Z2, from the coil CO disposed inside the first case member CS1 to the inside of the second case member CS2. The coil-side terminal 9 is attached to the distal end of the coil connection conductor 35 on the hole-extending-direction second side Z2.

The inverter IN is accommodated in an inverter housing 22 enclosed by the second case member CS2 and a housing cover member 21 (i.e., housing cover) joined to the outer surface of the second case member CS2. The case opening 23 is formed at a portion of the second case member CS2 forming the inverter housing 22. Note that in the present embodiment, as indicated by the contour lines in FIG. 1, the case member CS also accommodates a power transmission device 36 such as a transmission that transmits a driving force of the electric motor MG to the wheels.

The terminal base main body 3 is partially disposed inside the case member CS. At least the coil terminal insertion hole 4 and the internal screw holding portion 13 are disposed inside the case member CS. Furthermore, in the internal space 20 of the case member CS, the coil-side terminal 9 extending from the coil CO of the electric motor MG is inserted into the coil terminal insertion hole 4.

The "inside of the case member CS" refers to a portion or an area that is exposed inside the case member CS when the attachment portion 10 of the terminal base 1 is attached to the case member CS. Furthermore, the "outside of the case member CS" refers to a portion or an area that is exposed outside the case member CS when the attachment portion 10 of the terminal base 1 is attached to the case member CS. Note that since the inverter housing 22 is enclosed and formed by an outer surface 48 of the case member CS, the inner space of the inverter housing 22 is outside the case member CS.

<Screw insertion Hole 2>

The external screw member 6 inserted from the outside to the inside of the case member CS is disposed in the screw insertion hole 2. The screw insertion hole 2 extends in the terminal base main body 3 from the outside to the inside of the case member CS in the axial direction X, and provides communication between the inside and the outside of the case member CS in the axial direction X. In the present embodiment, the axial direction X is orthogonal to a rotation axis A of the electric motor MG.

In the present embodiment, as illustrated in FIGS. 2, 3, and 5, the external screw member 6 includes a cylindrical shaft 42 having an outer periphery with a thread and a head 43 with which a tool such as a screwdriver for rotating the shaft 42 is engaged. As illustrated in FIG. 3, the external screw member 6 is inserted into the screw insertion hole 2, with the distal end of the shaft 42 first, from the outside to the inside of the case member CS. Therefore, when the external screw member 6 is inserted in the screw insertion hole 2, the head 43 is disposed on the outer side of the case member CS (the axially outer side XO) with respect to the shaft 42, and an engagement portion (in this example, a recessed portion with the shape of a six-pointed star) of the head 43 with which a tool is engaged faces the outside of the case member CS. Accordingly, it is possible to, from the outside of the case member CS, place the screwdriver on the head 43 (the engagement portion), and rotate and thread the external screw member 6 into the internal screw member 5. The shaft 42 extends through the through hole 15 of the first terminal 8 and the through hole 16 of the coil-side terminal 9 toward the axially inner side XI. On the other hand, the head 43 is disposed on the axially outer side XO of the first terminal 8 and the coil-side terminal 9, without extending through the through hole 15 of the first terminal 8 or the through hole 16 of the coil-side terminal 9. When the shaft 42 is threaded into the threaded hole of the internal screw member 5, the internal screw member 5 moves inside an axial movement space 17 toward the axially outer side XO in accordance with rotation of the head 43. Thus, the first terminal 8 and the coil-side terminal 9 are held from the axially opposite sides by the head 43 disposed on the axially outer side XO and the internal screw member 5 disposed on the axially inner side XI, so that the coil-side terminal 9 is fixed to the first terminal 8. In this manner, it is possible to, from the outside of the case member CS, rotate the external screw member 6 in the screw insertion hole 2 to thread the external screw member 6 into the internal screw member 5, and fix the coil-side terminal 9 to the first terminal 8.

<Seal Mechanism>

The terminal base 1 is provided with a seal mechanism so as to maintain the liquid tightness of the case member CS and prevent lubricating oil and the like from leaking from the inside to the outside of the case member CS. As described above, the attachment portion 10 includes a seal portion that seals the gap between the attachment portion 10 and the case opening 23. In the present embodiment, the seal member 25 including an annular elastic member extending along the entire circumference of the case opening 23 is disposed between the attachment portion 10 and the case member CS. This seal member 25 corresponds to the seal portion (i.e., seal). More specifically, an inwardly recessed annular groove is formed in the outer periphery of the attachment portion 10 along the entire circumference thereof, and the annular seal member 25 is fitted in the annular groove. The outer periphery of the seal member 25 is in contact with the inner periphery of the case opening 23 to form a seal between the inner periphery of the case opening 23 and the outer periphery of the attachment portion 10.

The terminal base 1 includes an insertion hole cover member 24 (i.e., insertion hole cover) that covers and seals an opening (hereinafter referred to as an outer opening 44) of each screw insertion hole 2 outside the case member CS. In the present embodiment, the outer opening 44 of each screw insertion hole 2 is not provided with a partition member that partitions between the three screw insertion holes 2 in the orthogonal direction Y. That is, the outer opening 44 is a single hole communicating in the orthogonal direction Y. To form the outer opening 44, each screw insertion hole 2 extends to the axially outer side XO (the outside of the case member CS) with respect to the portion in which the external screw member 6 after tread engagement is disposed. In this example, the screw insertion hole 2 extends to the axially outer side XO (the outside of the case member CS) with respect to the attachment portion 10, and this extending portion defines the outer opening 44 to which the insertion hole cover member 24 is attached. Since the outer opening 44 projects outside the case member CS, the insertion hole cover member 24 is easily attached to and removed from the outer opening 44.

The insertion hole cover member 24 is fitted onto the inner periphery of the outer opening 44 of the screw insertion holes 2. A seal member 30 including an annular elastic member extending along the entire circumference of the outer opening 44 is disposed between the inner periphery of the outer opening 44 and the outer periphery of the insertion hole cover member 24. More specifically, an inwardly recessed annular groove is formed in the outer periphery of the insertion hole cover member 24 along the entire circumference thereof, and the annular seal member 30 is fitted in the annular groove. The outer periphery of the seal member 30 is in contact with the inner periphery of the outer opening 44 to form a seal between the inner periphery of the outer opening 44 and the outer periphery of the insertion hole cover member 24, in this manner, the outer opening 44 of the screw insertion holes 2 providing communication between the inside and the outside of the case member CS is sealed by the insertion hole cover member 24, thereby maintaining the liquid tightness of the case member CS. As illustrated in FIG. 3, hook portions 38 extending to the axially inner side Xi are provided on the respective opposite sides of the insertion hole cover member 24 in the orthogonal direction. The hook portions 3 are hooked on respective projecting portions 41 disposed on the respective opposite sides of the terminal base main body 3 in the orthogonal direction, so that the insertion hole cover member 24 is fixed to the terminal base main body 3.

<Coil Terminal Insertion Hole 4>

The coil terminal insertion hole 4 is formed to intersect with the screw insertion hole 2, and extends in the terminal base main body 3 in the hole extending direction intersecting with the axial direction X. In the present embodiment, the center axis (coinciding with the rotation axis C, in this example) of the screw insertion hole 2 and the center axis of the coil terminal insertion hole 4 intersect with each other. The hole extending direction 7 is orthogonal to the axial direction X, and is parallel to the rotation axis A of the electric motor MG. The coil terminal insertion hole 4 extends inside the terminal base main body 3 to the hole-extending-direction first side Z1 toward the coil CO, and is open toward the hole-extending-direction first side Z1. An enlarged portion 49 is provided at the opening end of the coil terminal insertion hole 4 on the hole-extending-direction first side Z1. The cross-sectional area of the enlarged portion 49 gradually increases toward the hole-extending-direction first side Z1. The enlarged portion 49 makes it easy to insert the coil-side terminal 9 into the coil terminal insertion hole 4. On the other hand, the coil terminal insertion hole 4 is not open toward the hole-extending-direction second side Z2. Accordingly, when the coil-side terminal 9 inserted from the coil terminal insertion hole 4 comes into contact with the wall on the hole-extending-direction second side Z2, the coil-side terminal 9 is positioned in the hole extending direction 7. When the coil-side terminal 9 is positioned, the through hole 16 of the coil-side terminal 9 is disposed at the intersection 14 with the screw insertion hole 2, thereby allowing the external screw member 6 to extend therethrough.

The width of the through hole 16 of the coil-side terminal 9 in the hole extending direction Z is greater than the width of the shaft 42 (the outer diameter of the shaft 42) of the external screw member 6 in the hole extending direction Z. In this example, as illustrated in FIG. 3, the through hole 16 has the shape of an elongated hole that is elongated in the hole extending direction Z. Therefore, even when the position of the coil-side terminal 9 is slightly shifted in the hole extending direction Z, the shaft 42 of the external, screw member 6 can extend through the through hole 16 of the coil-side terminal 9.

<Extending to Inside of Case Member CS>

In the present embodiment, as illustrated in FIGS. 1 and 2, the coil terminal insertion hole 4 is disposed on the inner side (the axially inner side XI) with respect to an inner surface 45 of the case member CS such that the coil-side terminal 9 extending from the coil CO is directly inserted thereinto, in the internal space 20 of the case member CS. Accordingly, the internal screw holding portion 13 is also disposed on the inner side (the axially inner side XI) with respect to the inner surface 45 of the case member CS. Therefore, a portion (hereinafter referred to as an inner arrangement portion 46) of the terminal base main body 3 where the coil terminal insertion hole 4 and the internal screw holding portion 13 are formed is disposed on the inner side (the axially inner side XI) with respect to the inner surface 45 of the case member CS. As illustrated in FIGS. 1 to 4, the terminal base main body 3 (the inner arrangement portion 46) is formed in the shape of a cuboid whose corners in the cross section orthogonal to the axial direction X are chamfered (corners in the cross section extending in the hole extending direction Z and the orthogonal direction Y are chamfered). The terminal base main body 3 extends toward the inner side (the axially inner side XI) of the case member CS, from the attachment portion 10 attached to the case member CS to the inner arrangement portion 46 disposed on the inner side with respect to the inner surface 45 of the case member CS.

The extending length toward the axially inner side XI, from the attachment portion 10 to the coil terminal insertion hole 4 is set in accordance with the position of the coil-side terminal 9 extending from the coil CO inside the case member CS and the thickness of the wall of the case member CS. That is, the extending length matches the arrangement of these components (the coil CO, the coil-side terminal 9, and the case member CS).

<Connecting Member 7>

The first terminal 8 of the connecting member 7 is disposed at the intersection 14 between the coil terminal insertion hole 4 and the screw insertion hole 2. The axis of the through hole 15 of the first terminal 8 coincides with the rotation axis C of the external screw member 6. The first terminal 8 extends in the coil terminal insertion hole 4 in the hole extending direction Z. As illustrated in FIG. 2, the connecting member includes an inner extending portion 26 (i.e., inner extender) and an outer extending portion 27 (i.e., outer extender). The inner extending portion 26 is a portion extending inside the terminal base main body 3 from the first terminal 8 disposed in the coil terminal insertion hole 4 toward the outside of the case member CS. The outer extending portion 27 is a portion projecting outside the case member CS from the inner extending portion 26 to the outside of the terminal base main body 3 and connected to the inverter-side wiring member 12.

This configuration allows the connecting member 7 to extend from the first terminal 8 disposed inside the case member CS to the outside of the case member CS and to be connected to the inverter-side wiring member 12 disposed outside the case member CS. Furthermore, since the connecting member 7 extends inside the terminal base main body 3 toward the outside of the case member CS, it is possible to form a seal around the connecting member 7 extending through the inside of the case member CS from the inside to the outside thereof with the terminal base main body 3, and thereby maintain the liquid tightness of the case member CS. In this example, the connecting member 7 is insert-molded in the terminal base main body 3.

In the present embodiment, the connecting member 7 extends inside the terminal base main body 3 located on the hole-extending-direction first side Z1 of the screw insertion hole 2, from the end of the first terminal 8 on the hole-extending-direction first side Z1 to the axially outer side XO, and then extends outside the case member CS to the hole-extending-direction first side Z1.

The outer extending portion 27 includes a second terminal 47 which is the other terminal of the Connecting member 7 and to which the inverter-side wiring member 12 is connected. An external screw member 31 is inserted into a through hole formed in the second terminal 47 and a through hole formed in a connecting terminal of the inverter-side wiring member 12, and the external screw member 31 is threaded into an internal screw member 32, thereby fixing the second terminal 47 to the connecting terminal of the inverter-side wiring member 12. The internal screw member 32 is integrally fixed to the second terminal 47 by welding or the like.

<Configuration of Internal Screw Holding Portion 13>

As described above, the internal screw holding portion 13 is formed in a portion of the screw insertion hole 2, on the axially inner side XI with respect to the intersection 14. In the present embodiment, the internal screw holding portion 13 includes a rotation restricting portion 18 (i.e., rotation restrictor) that restricts rotation of the internal screw member 5. With this configuration, the rotation of the internal screw member 5 is restricted by the rotation restricting portion 18. Therefore, there is no need to hold the internal screw member 5 in the case member CS by a tool or the like, and it is possible to thread the external screw member 6 into the internal screw member 5 by only rotating the external screw member 6 from the outside of the case member CS.

As described above, the first terminal 8 of the connecting member 7 is disposed at the intersection 14 between the coil terminal insertion hole 4 and the screw insertion hole 2. In the present embodiment, the coil-side terminal 9 is configured to be inserted in a space in the coil terminal insertion hole 4, on the axially inner side XI with respect to the first terminal 8. The internal screw holding portion 13 includes the axial movement space 17 that allows movement of the internal screw member 5 in the axial direction X. With this configuration, the coil-side terminal 9 is inserted into a space between the first terminal 8 and the internal screw member 5. As the external screw member 6 is threaded into the internal screw member 5, the internal screw member 5 moves to the axially outer side XO. Thus, the coil-side terminal 9 is held by the first terminal 8 and the internal screw member 5 from the axially opposite sides, so that the coil-side terminal 9 can be fixed to the first terminal 8. The internal screw holding portion 13 includes an axial movement restricting portion 19 (i.e., axial movement restrictor) that restricts movement of the fastening member 11 in the axial direction X to a certain range.

The internal screw member 5 includes a threaded hole extending in the axial direction X, and a thread is formed on the inner periphery of the threaded hole. Furthermore, the internal screw member 5 includes a chamfered portion 34 having a chamfered outer periphery. The chamfered portion 34 fits into the rotation restricting portion 18 of the internal screw holding portion 13, so that circumferential rotation is restricted. In the present embodiment, a portion of the internal screw member 5 on the axially outer side XO is a cylindrical portion 33 formed in a cylindrical shape as illustrated in FIGS. 2 and 3, and a portion of the internal screw member 5 on the axially inner side XI is an enlarged portion having a greater diameter than the cylindrical portion 33 as illustrated in FIGS. 3 and 4. The outer periphery of the enlarged portion is the chamfered portion 34 that is cut by a plane parallel to the axial direction X and chamfered. In the present embodiment, the chamfered portion 34 is cut by eight planes parallel to the axial direction X, and has an octagonal shape in a cross section orthogonal to the axial direction X. The rotation restricting portion 18 of the internal screw holding portion 13 also has an octagonal shape in a cross section orthogonal to the axial direction X to correspond to the chamfered portion 34.

In the present embodiment, a portion of the internal screw holding portion 13 on the axially outer side XO has an introduction hole 50. The cylindrical portion 33 of the internal screw member 5 extends through in the axial direction X and fits the introduction hole 50. The introduction hole 50 provides communication between the internal screw holding portion 13 and the coil terminal insertion hole 4. The center axis of the introduction hole 50 coincides with the center axis of the screw insertion hole 2. The axial length of the introduction hole 50 is less than the axial length of the cylindrical portion 33. FIG. 5 illustrates the external screw member 6 before thread engagement with the internal screw member 5, and FIG, 2 illustrates the external screw member 6 after thread engagement with the internal screw member 5. When the external screw member 6 is threaded into the internal screw member 5, the cylindrical portion 33 moves to the axially outer side XO in the introduction hole 50 to project into the coil terminal insertion hole 4. Thus, the end face of the cylindrical portion 33 on the axially outer side XO comes into contact with the coil-side terminal 9.

The portion of the internal screw holding portion 13 on the axially outer side XO is the rotation restricting portion 18 that is chamfered to correspond to the chamfered portion 34 of the internal screw member 5. In the present embodiment, as illustrated in FIG. 4, the rotation restricting portion 18 has a greater inner diameter than the introduction hole 50 and has a shape corresponding to the chamfered portion 34. In the present embodiment, the rotation restricting portion 18 has an octagonal shape in a cross section orthogonal to the axial direction X, except an arrangement space 39 where below-described locking portions 28 (i.e. locks) are disposed, to correspond to the chamfered portion 34, and is formed in a tubular shape extending in the axial direction X. Note that a portion of the rotation restricting portion 18 where the arrangement space 39 is disposed has a quadrangular shape (a rectangular shape) with sides parallel to the orthogonal direction Y and sides parallel to the hole extending direction Z, in a cross section orthogonal to the axial direction X. The chamfered portion 34 fits into the rotation restricting portion 18, so that circumferential rotation of the internal screw member 5 is restricted. As illustrated in FIGS, 2 and 5, the length of the rotation restricting portion 18 in the axial direction X is greater than the length of the chamfered portion 34 in the axial direction X, and the chamfered portion 34 is movable in the rotation restricting portion 18 in the axial direction X.

The axially outer side XO of the rotation restricting portion 18 is partially covered with a stepped face between the rotation restricting portion 18 and the introduction hole 50, and the axially inner side XI of the rotation restricting portion 18 is covered with a lid member 29. Accordingly, the movement of the chamfered portion 34 in the axial direction X is restricted to the range of the axial length of the rotation restricting portion 18. In the present embodiment, the lid member 29 and the stepped face between the rotation restricting portion 18 and the introduction hole 50 form the axial movement restricting portion 19.

As illustrated in FIG. 5 (before thread engagement) and FIG, 2 (after thread engagement), as the external screw member 6 is threaded into the internal screw member 5, the chamfered portion 34 moves in the rotation restricting portion 18 toward the axially outer side XO. As illustrated in FIG. 2, when the end face of the cylindrical portion 33 on the axially outer side XO comes into contact with the coil-side terminal 9 to hold the first terminal 8 and the coil-side terminal 9 between the end face of the cylindrical portion 33 and the head 43 of the external screw member 6, a gap is formed between the chamfered portion 34 and the stepped face between the rotation restricting portion 18 and the introduction hole 50.

<Lid Member 29>

The internal screw holding portion 13 is formed to be open to the axially inner side XI of the terminal base main body 3. The lid member 29 is attached to the axially inner side XI of the terminal base main body 3 to cover the opening of the terminal base main body 3. As illustrated in FIGS. 2 and 3, the lid member 29 is formed in the shape of a chamfered rectangular plate to cover the entire end face of the terminal base main body 3 on the axially inner side XI. Hook portions 37 extending to the axially outer side XO are provided on the respective opposite sides of the lid member 29 in the hole extending direction. The hook portions 37 are hooked on respective projecting portions 40 disposed on the respective opposite sides of the terminal base main body 3 in the hole extending direction, so that the lid member 29 is fixed to the terminal base main body 3.

<Locking Mechanism of Internal Screw Member 5>

As illustrated in FIG. 5, the internal screw member 5 is disposed in the internal screw holding portion 13 in a manner such that the internal screw member 5 does not project into the intersection 14 (the coil terminal insertion hole 4) when the external screw member 6 is not threaded in the internal screw member 5. With this configuration, since the internal screw member 5 does not project into the coil terminal insertion hole 4, the coil-side terminal 9 is easily inserted into the coil terminal insertion hole 4.

The internal screw holding portion 13 includes the locking portions 28 that restrain movement of the internal screw member 5 to the axially outer side XO. The holding force of the locking portions 28 in the axial direction X is greater than the force toward the axially outer side XO that may be applied to the internal screw member 5 by the own weight of the internal screw member 5, and is smaller than the force toward the axially outer side XO applied to the internal screw member 5 by thread engagement between the internal screw member 5 and the external screw member 6. With this holding force, the locking portions 28 lock the internal screw member 5 to prevent the internal screw member 5 from moving to the axially outer side XO when the external screw member 6 is not threaded in the internal screw member 5. On the other hand, when the external screw member 6 is threaded into the internal screw member 5, the force toward the axially outer side XO applied to the internal screw member 5 becomes greater than a predetermined value (holding force). The locking portions 28 then allow the internal screw member 5 to move to the axially outer side XO. Accordingly, since the internal screw member 5 can be held so as not to project to the coil terminal insertion hole 4 side (the axially outer side XO) until the external screw member 6 is threaded into the internal screw member 5, the coil-side terminal 9 is easily inserted into the coil terminal insertion hole 4.

In this embodiment, each locking portion 28 is a locking claw that locks the chamfered portion 34 having a greater diameter, and is formed in the shape of a triangle pointing to the rotation axis C in a cross section parallel to the axial direction X. The locking portion 28 (the locking claw) is formed to be disposed on the axially outer side XO of the chamfered portion 34 when the internal screw member 5 is moved to the axially inner side XI. One locking portion 28 (the locking claw) is disposed each of the hole-extending-direction first side Z1 and the hole-extending-direction second side Z2 of the chamfered portion 34. The locking portions 28 (the locking claws) are provided on the lid member 29, and project from the surface of the lid member 29 on the axially outer side XO to the axially outer side XO.

The internal screw holding portion 13 (the rotation restricting portion 18) includes the arrangement space 39 where the locking portions 28 are disposed. The arrangement space 39 is a space extending to the hole-extending-direction first side Z1 and the hole-extending-direction second side Z2, at a part of the rotation restricting portion 18 on the axially inner side XI. One locking portion 28 is disposed on each of the hole-extending-direction first side Z1 and the hole-extending-direction second side Z2 in the arrangement space 39.

<Arrangement of First Terminal 8>

The first terminal 8 of the connecting member 7 is disposed on the axially outer side XO with respect to the center of the coil terminal insertion hole 4 in the axial direction X. Therefore, the space in the coil terminal insertion hole 4 on the axially inner side Xi with respect to the first terminal 8 can be increased, making it easy to insert the coil-side terminal 9 into the space. In the present embodiment, the first terminal 8 is disposed on the axially outer side XO in the coil terminal insertion hole 4 so as to be in contact with the end face of the coil terminal insertion hole 4 on the axially outer side XO. Therefore, the space in the coil terminal insertion hole 4 on the axially inner side XI with respect to the first terminal 8 can be maximized.

In the present embodiment, as described above, the connecting member 7 extends inside the terminal base main body 3 located on the hole extending-direction first side Z1 of the screw insertion hole 2, from the end of the first terminal 8 on the hole-extending-direction first side Z1 to the axially outer side XO (the outside of the case member CS), and then extends outside the case member CS to the hole-extending-direction first side Z 1. That is, the connecting member 7 extends from the first terminal 8 to the hole-extending-direction first side Z1 which is the same side as the open side of the coil terminal insertion hole 4 into which the coil-side terminal 9 is inserted. As described above, the coil-side terminal 9 is inserted into a space in the coil terminal insertion hole 4 on the axially inner side XI with respect to the first terminal 8. Accordingly, even though the connecting member 7 extends from the end of the first terminal 8 on the hole-extending-direction first side Z1 to the axially outer side XO, the insertion space of the coil-side terminal 9 is not blocked by the portion extending to the axially outer side XO. In this manner, since the coil-side terminal 9 is inserted into a space in the coil terminal insertion hole 4 on the axially inner side XI with respect to the first terminal 8, the degree of freedom in the extending direction of the connecting member 7 from the first terminal 8 can be increased.

<Assembly Process>

The terminal base 1 with the internal screw members 5 held in the respective internal screw holding portions 13 is inserted from the outside of the case member CS into the case opening 23 of the case member CS, and is attached to the case member CS by the attachment portion 10. In the present embodiment, the terminal base 1 is attached to the case opening 23 of the second case member CS2. Furthermore, the internal screw members 5 are each locked by the locking portions 28 of the lid member 29, and the internal screw members 5 are held on the axially inner side XI in the respective internal screw holding portions 13.

Next, the coil-side terminals 9 are inserted into the respective coil terminal insertion holes 4 from the hole-extending-direction first side Z1. In the present embodiment, the first case member CS1 accommodating the electric motor MG therein is fixed to the second case member CS2 from the hole-extending-direction first side Z1. At this point, the coil-side terminals 9 extending from the electric motor MG to the hole-extending-direction second side Z2 are inserted into the respective coil terminal insertion holes 4 from the hole-extending-direction first side Z1.

After that, the external screw members 6 are inserted into the screw insertion hole 2 from the outside of the case member CS, and each extend through the through hole 15 formed in a corresponding one of the first terminals 8 and the through hole 16 formed in a corresponding one of the coil-side terminals 9 toward the axially inner side XI. Next, the external screw members 6 inserted in the screw insertion hole 2 are rotated by a tool such as a screwdriver from the outside of the case member CS so as to be threaded into the respective internal screw members 5, so that the coil-side terminals 9 are fixed to the respective first terminals 8.

The insertion hole cover member 24 is then attached to the outer opening 44 of the screw insertion hole 2 to seal the screw insertion hole 2. Furthermore, the inverter-side firing members 12 are each connected to the second terminal 47 of a 4; corresponding one of the connecting members 7 extending outside the case member CS. After that, the housing cover member 21 is joined to the outer surface of the second ease member CS2, so that the terminal base 1 is covered with the housing cover member 21.

(Other Embodiments)

Hereinafter, other embodiments will b described. The configuration disclosed in each of the following embodiments may be a plied alone, or may be applied in combination with the configuration disclosed in any other embodiments as long as no inconsistency arises.

(1) in the above embodiment, an example has been described in which the case member CS to which the terminal base 1 is attached accommodates the power transmission device 36 such as a transmission, in addition to the electric motor MG. However, the case member CS to Which the terminal base 1 is attached is not limited to this aspect. That is, the case member CS does not have to accommodate the power transmission device 36 such as a transmission, in addition to the electric motor MG, and may accommodate another device.

(2) in the above embodiment, an example has been described in which the three external screw members 6 (screw insertion holes 2) are arranged parallel to each other and aligned in the orthogonal direction Y, and the three coil-side terminals 9 (coil terminal insertion holes 4) are arrange parallel to each other and aligned in the orthogonal direction Y, at the same pitch as the arrangement pitch of the three external screw members 6. However, the arrangement of the external screw members 6 (the screw insertion holes 2) is not limited to this aspect. That is, the three external screw members 6 (screw insertion holes 2) do not have to be arranged parallel to each other or aligned. Moreover, the three coil-side terminals 9 (coil terminal insertion holes 4) do not have to be arranged parallel to each other or aligned.

(3) in the above embodiment, an example has been described in which the terminal base 1 is a terminal base for the three-phase alternating-current electric motor MG, and includes three connecting members 7 and fastening members 11. However, the number of connecting members 7 and the number of fastening members II are not limited to three. That is, the terminal base 1 may include the same number of connecting members 7 and the same number of fastening members 11 as the number of coil-side terminals 9.

(4) In the above embodiment, an example has been described in which the case member CS includes the first ease member CS1 that accommodates the electric motor MG, and the second case member CS2 that is connected to the first case member CS1, and the attachment portion 10 is attached to the case opening 23 formed at a portion of the second case member CS2 forming the inverter housing 22. However, the case member CS and the attachment portion 10 are not limited to this aspect. That is, the case member CS may be formed by connecting any number of case members, and the attachment portion 10 may be attached to an opening that is formed in any position of the case member CS.

(5) In the above embodiment, an example has been described in which the coil-side terminal 9 is inserted into a space in the coil terminal insertion hole 4, on the axially inner side XI with respect to the first terminal 8. However, the coil-side terminal 9 may be configured to be inserted in a space in the coil terminal insertion hole 4, on the axially outer side XO with respect to the first terminal 8. In this case, the internal screw holding portion 13 does not have to include the axial movement space 17 that allows movement of the internal screw member 5 in the axial direction X, and may be configured so as not to allow movement of the internal screw member 5 in the axial direction X.

(6) In the above embodiment, an example has been described in which the terminal base 1 includes the insertion hole cover member 24 that covers and seals the opening (the outer opening 44) of the screw insertion hole 2 outside the case member CS. However, the terminal base 1 does not have to include the insertion hole cover member 24. In this case, for example, the external screw member 6 may be configured such that, when threaded into the internal screw member 5, a through hole in the screw insertion hole 2 through which the shaft 42 extends is covered and sealed with the head 43 of the external screw member 6 or the like.

(7) In the above embodiment, an example has been described in Which the connecting member 7 is configured to extend inside the terminal base main body 3 toward the outside of the case member CS. However, the connecting member 7 may be configured to extend outside the terminal base main body 3 toward the outside of the case member CS. In this case, for example, the connecting member 7 may be configured to extend inside the seal portion of the attachment portion (10) toward the outside of the ease member CS to maintain the sealing properties around the connecting member 7.

(8) In the above embodiment, an example has been described in which the insertion hole cover member 24 and the seal portion of the attachment portion 10 are provided to maintain the liquid tightness of the case member CS. However, when there is no need to provide sealing properties between the inside and the outside of the case member CS, the insertion hole cover member 24 and the seal portion of the attachment portion 10 do riot have to be provided.

(9) In the above embodiment, an example has been described in which the internal screw member 5 is disposed in the internal screw holding portion 13 in a manner such that the internal screw member 5 does not project into the intersection 14 when the external screw member 6 is not threaded in the internal screw member 5. However, the internal screw member 5 may be disposed in a manner such that the internal screw member 5 projects into the intersection 14 within a range that allows insertion of the coil-side terminal 9 when the external screw member 6 is not threaded in the internal screw member 5.

(10) In the above embodiment, an example has been described in which the connecting member 7 extends inside the terminal base main body 3 located on the hole-extending-direction first side Z1 of the screw insertion hole 2, from the end of the first terminal 8 on the hole-extending-direction first side Z1 to the axially outer side XO, and then extends outside the case member CS to the hole-extending-direction first side Z1. However, the connecting member 7 is not limited to this aspect. For example, the connecting member 7 may extend inside the terminal base main body 3 located on the hole-extending-direction second side Z2 of the screw insertion hole 2, from the end of the first terminal 8 on the hole-extending-direction second side Z2 to the axially outer side XO, and then extend outside the case member CS to the hole-extending-direction second side Z2.

(11) In the above embodiment, an example has been described in which the locking portion 28 is a locking claw. However, the locking portion 28 may be an elastic member such as rubber disposed between the internal screw member 5 and the internal screw holding portion 13.

2. Summary of Embodiments

The following provides a brief summary of the terminal base (1) described above.

In one aspect, a terminal base (1) is disposed on an electrical connection path between a coil (CO) of an electric motor (MG) accommodated inside a case member (CS) and an inverter (IN) disposed outside the case member (CS), and connects a coil-side terminal (9) serving as a terminal on a coil (CO) side to an inverter-side wiring member (12) serving as a wiring member on an inverter (TN) side. The terminal base (1) includes: a connecting member (7) that electrically connects the inverter-side wiring member (12) and the coil-side terminal (9); a fastening member (11) that fixes the coil-side terminal (9) to a first terminal (8) serving as one terminal of the connecting member (7); and a terminal base main body (3) that holds the connecting member (7). The fastening member (11) includes an internal screw member (5), and an external screw member (6) that is threaded into the internal screw member (5); the terminal base main body (3) includes an attachment portion (10) that is attached to the case member (CS), a screw insertion hole (2) in which the external screw member (6) inserted from the outside to the inside of the case member (CS) is disposed, a coil terminal insertion hole (4) which is disposed inside the case member (CS) and into which the coil-side terminal (9) is inserted, and an internal screw holding portion (13) that holds the internal screw member (5); the coil terminal insertion hole (4) is formed to intersect with the screw insertion hole (2); the first terminal (8) is disposed at an intersection (14) between the coil terminal insertion hole (4) and the screw insertion hole (2); a direction parallel to a rotation axis (C) of the external screw member (6) disposed in the screw insertion hole (2) is defined as an axial direction (X), and a side directed to the inside of the case member (CS) in the axial direction (X) is defined as an axially inner side (XI); the internal screw holding portion (13) is formed in a portion of the screw insertion hole (2), on the axially inner side (Xi) with respect to the intersection (14); and when the external screw member (6) extends through a through hole (15) formed in the first terminal (8) and a through hole (16) formed in the coil-side terminal (9) and is threaded into the internal screw member (5), the coil-side terminal (9) is fixed to the first terminal (8).

With this configuration, when the external screw member (6) extends through the through hole (15) formed in the first terminal (8) and the through hole (16) formed in the coil-side terminal (9) and is threaded into the internal screw member (5), the coil-side terminal (9) is fixed to the first terminal (8). The external screw member (6) is inserted into the screw insertion hole (2) from the outside to the inside of the case member (CS). That is, with this configuration, the terminal base (1) allows the coil-side terminal (9) to be connected to the inverter-side wiring member (12), from the outside of the case member (CS). Accordingly, there is no need to provide an opening to service hole) described in Japanese Patent Application Publication No. 2008-301572 in the case member (CS) for connection. In other words, only the hole for the wiring member (12) between the electric motor (MG) and the inverter (IN) needs to be provided in the ease member (CS). This increases the degree of freedom in the shape of the case member (CS), and makes it less likely to increase the size and the weight of the case member (CS).

More specifically, with this configuration, by inserting the external screw member (6) into the screw insertion hole (2) from the outside to the inside of the case member (CS), and rotating the external screw member (6) inserted in the screw insertion hole (2) by a tool such as a screwdriver from the outside of the case member (CS), the external screw member (6) is threaded into the internal screw member (5) held in the internal screw holding portion (13) in the case member (CS). Thus, the coil-side terminal (9) inserted in the coil terminal insertion hole (4) can be fixed to the first terminal (8) of the connecting member (7) connected to the inverter-side wiring member (12).

Since the coil terminal insertion hole (4) is disposed inside the case member (CS), it is possible to insert the coil-side terminal (9) extending from the coil (CO) of the electric motor (MG) inside the case member (CS). Furthermore, since the coil terminal insertion hole (4) is formed to intersect with the screw insertion hole (2), the external screw member (6) inserted from the outside of the case member (CS) can be inserted into the through hole (16) of the coil-side terminal (9) disposed at the intersection (14) between the coil terminal insertion hole (4) and the screw insertion hole (2). Moreover, since the first terminal (8) of the connecting member (7) is disposed at the intersection (14), the external screw member (6) inserted from the outside of the case member (CS) can be inserted into the through hole (15) of the first terminal (8).

Furthermore, since the internal screw holding portion (13) is formed in a portion of the screw insertion hole (2), on the axially inner side (XI) with respect to the intersection (14), the internal screw member (5) is disposed on the axially inner side (XI) with respect to the first terminal (8) and the coil-side terminal (9) disposed at the intersection (14). By causing the external screw member (6) inserted from the outside of the case member (CS) to extend through the through hole (15) of the first terminal (8) and the through hole (16) of the coil-side terminal (9) toward the axially inner side (XI), and threading the external screw member (6) into the internal screw member (5) from the outside of the case member (CS), it is possible to hold the first terminal (8) and the coil-side terminal (9) by the external screw member (6) and the internal screw member (5) from the axially opposite sides, and fix the coil-side terminal (9) to the first terminal (8). Therefore, it is possible to connect, from the outside of the case member (CS), the coil-side terminal (9) to the connecting member (7) connected to the inverter-side wiring member (12).

In another aspect, it is preferable that: the coil-side terminal (9) be inserted in a space in the coil terminal insertion hole (4), on the axially inner side (XI) with respect to the first terminal (8); and the internal screw holding portion (13) include an axial movement space (17) that allows movement of the internal screw member (5) in the axial direction (X), and a rotation restricting portion (18) that restricts rotation of the internal screw member (5).

With this configuration, the rotation of the internal screw member (5) is restricted by the rotation restricting portion (18). Therefore, there is no need to hold the internal screw member (5) in the case member (CS) by a tool or the like, and it is possible to thread the external screw member (6) into the internal screw member (5) by only rotating the external screw member (6) from the outside of the case member (CS). Furthermore, with this configuration, the coil-side terminal (9) is inserted into a space between the first terminal (8) and the internal screw member (5). As the external screw member (6) is threaded into the internal screw member (5), the internal screw member (5) can be moved to the axially outer side (XO). Thus, it is possible to hold the coil-side terminal (9) by the first terminal (8) and the internal screw member (5) from the axially opposite sides, and fix the coil-side terminal (9) to the first terminal (8).

In another aspect, it is preferable that the internal screw holding portion (13) include an axial movement restricting portion (19) that restricts movement of the internal screw member (5) in the axial direction (X) to a certain range.

With this configuration, as the external screw member (6) is threaded into the internal screw member (5), the internal screw member (5) is moved to the axially outer side (XO), while the internal screw member (5) is prevented from falling from the terminal base main body (3). Thus, it is possible to hold and fix the first terminal (8) and the coil-side terminal (9) by the external screw member (6) and the internal screw member (5) from e axially opposite sides.

In another aspect, it is preferable that: the case member (CS) include a first case member (CS1) that accommodates the electric motor (MG), and a second case member (CS2) that is connected to the first case member (CS1), the first case member (CS1) and the second case member (CS2) forming an internal space (20); the inverter (IN) be accommodated in an inverter housing (22) enclosed by the second case member (CS2) and a housing cover member (21) joined to an outer surface of the second case member (CS2); the attachment portion (10) be attached to a case opening (23) thrilled at a portion of the second case member (CS2) forming the inverter housing (22); and the coil-side terminal (9) extend in the internal space (20) from a first case member (CS1) side to a second case member (CS2) side.

With this configuration, the terminal base (1) is attached to the case opening (23) provided in the second case member (CS2) different from the first case member (CS1) accommodating the electric motor (MG), and thus the coil-side terminal (9) can be connected to the inverter (IN) side disposed outside the case member (CS). Accordingly, it is possible to increase the degree of freedom in the arrangement of the case opening (23) and the degree of freedom in the arrangement of the inverter (IN) with respect to the electric motor (MG) and the first case member (CS1). Furthermore, when the first case member (CS1) accommodating the electric motor (MG) is connected to the second case member (CS2), the coil-side terminal (9) extending from the electric motor (MG) can be inserted into the coil terminal insertion hole (4). This can improve the efficiency of assembly of the terminal base (1).

In this case, the position tolerance of the coil-side terminal (9) extending from the electric motor (MG) can be increased. In the case where a service hole for work is not provided in the case member (CS), when the position error of the coil-side terminal (9) is large, it may be difficult to align the terminal base (1) and the coil-side terminal (9). However, with this configuration, it is possible to cancel the error by a so-called, nut structure (the structure including the internal screw member (5) and the internal screw holding portion (13)). Therefore, even when a relatively large tolerance is allowed, it is possible to reliably perform assembly. For example, in the case where the terminal base (1) is disposed in a case of the electric motor (MG), it is more likely that such an error becomes larger compared to the case where the terminal base (1) is disposed a housing of the electric motor (MG), and therefore this configuration is effective. This configuration is particularly effective in the case where after the electric motor (MG) is fixed to the housing, the coil-side terminal (9) is fastened in the terminal base (1) disposed in a case (for example, a case of a drive device or a drive transmission device of a vehicle or the like) different from the housing.

In another aspect, it is preferable that: the terminal base (1) further include an insertion hole cover member (24) that covers and seals an opening (44) of the screw insertion hole (2) outside the case member (CS); the attachment portion (10) is attached to a case opening (23) formed in the case member (CS), and include a seal portion (25) that seals a gap between the attachment portion (10) and the case opening (23); and the connecting member (7) include an inner extending portion (26) and an outer extending portion (27), the inner extending portion (26) extending inside the terminal base main body (3) from the first terminal (8) toward the outside of the case member (CS), the outer extending portion (27) projecting outside the case member (CS) from the inner extending portion (26) to the outside of the terminal base main body (3) and connected to the inverter-side wiring member (12).

With this configuration, the outer opening (44) of the screw insertion hole (2) providing communication between the inside and the outside of the case member (CS) can be sealed by the insertion hole cover member (24). Furthermore, the gap between the case opening (23) and the attachment portion (10) can be sealed by the seal portion (25) of the attachment portion (10). Furthermore, since the connecting member (7) extends inside the terminal base main body (3) toward the outside of the case member (CS), it is possible to form a seal around the connecting member (7) extending through the inside of the case member (CS) from the inside to the outside thereof with the terminal base main body (3). With these seal mechanisms, it is possible to maintain the liquid tightness of the case member CS. Moreover, it is possible to allow the connecting member (7) to extend from the first terminal (8) disposed inside the case member (CS) to the outside of the case member (CS) and be connected to the inverter-side wiring member (12) disposed outside the case member (CS), while maintaining the liquid tightness.

In another aspect, it is preferable that: the coil-side terminal (9) be inserted. in a space in the coil terminal insertion hole (4), on the axially inner side (XI) with respect to the first terminal (8); and the internal screw member (5) be disposed in the internal screw holding portion (13) in a manner such that the internal screw member (5) does not project into the intersection (14) when the external screw member (6) is not threaded in the internal screw member (5).

With this configuration, since the internal screw member (5) does not project into the coil terminal insertion hole (4), the coil-side terminal (9) is easily inserted into the coil terminal insertion hole (4). This allows misalignment of the coil-side terminal (9).

In another aspect, it is preferable that: the internal screw holding portion (13) include a locking portion (28) that restrains movement of the internal screw member (5) to an axially outer side (XO) opposite to the axially inner side (XI); and the locking portion (28) generate a holding force in the axial direction (X), the holding force being greater than a fierce toward the axially outer side (XO) applicable to the internal screw member (5) by a weight of the internal screw member (5), and smaller than a force toward the axially outer side (XO) applied to the internal screw member (5) by thread engagement between the internal screw member (5) and the external screw member (6).

With this configuration, since the internal screw member (5) can be held by the locking portion (28) so as not to project to the coil terminal insertion hole (4) side until the external screw member (6) is threaded into the internal screw member (5), the coil-side terminal (9) is easily inserted into the coil terminal insertion hole (4). This allows misalignment of the coil-side terminal (9).

The invention claimed is:

1. A terminal base that is disposed on an electrical connection path between a coil of an electric motor accommodated inside a case and an inverter disposed outside the case and connects a coil-side terminal serving as a terminal on a coil side to an inverter-side wiring member serving as a wiring member on an inverter side, the terminal base comprising:
   a connector that electrically connects the inverter-side wiring member and the coil-side terminal;
   a fastener that fixes the coil-side terminal to a first terminal serving as one terminal of the connector; and a terminal base main body that holds the connector, wherein:
- the fastener includes an internal screw and an external screw that is threaded into the internal screw;
- the terminal base main body includes an attachment that is attached to the case, a screw insertion hole in which the external screw inserted from the outside to the inside of the case is disposed, a coil terminal insertion hole which is disposed inside the case and into which the coil-side terminal is inserted, and an internal screw holder that holds the internal screw;
- the coil terminal insertion hole is formed to intersect with the screw insertion hole;
- the first terminal is disposed at an intersection between the coil terminal insertion hole and the screw insertion hole;
- a direction parallel to a rotation axis of the external screw disposed in the screw insertion hole is defined as an axial direction, and a side directed to the inside of the case in the axial direction is defined as an axially inner side;
- the internal screw holder is formed in a portion of the screw insertion hole, on the axially inner side with respect to the intersection; and
- when the external screw extends through a through hole formed in the first terminal and a through hole formed in the coil-side terminal and is threaded into the internal screw, the coil-side terminal is fixed to the first terminal.

2. The terminal base according to claim 1, wherein:
the coil-side terminal is inserted in a space in the coil terminal insertion hole, on the axially inner side with respect to the first terminal; and
the internal screw holder includes an axial movement space that allows movement of the internal screw in the axial direction, and a rotation restrictor that restricts rotation of the internal screw.

3. The terminal base according to claim 1, wherein
the internal screw holder includes an axial movement restrictor that restricts movement of the internal screw in the axial direction to a certain range.

4. The terminal base according to claim 1, wherein:
the case includes a first case that accommodates the electric motor, and a second case that is connected to the first case, the first case and the second case forming an internal space;
the inverter is accommodated in an inverter housing enclosed by the second case and a housing cover joined to an outer surface of the second case;
the attachment is attached to a case opening formed at a portion of the second case forming the inverter housing; and
the coil-side terminal extends in the internal space from a first case side to a second case side.

5. The terminal base according to claim 1, further comprising:
an insertion hole cover that covers and seals an opening of the screw insertion hole outside the case; wherein:
the attachment is attached to a case opening formed in the case, and includes a seal that seals a gap between the attachment and the case opening; and
the connector includes an inner extender and an outer extender, the inner extender extending inside the terminal base main body from the first terminal toward the outside of the case, the outer extender projecting outside the case from the inner extender to the outside of the terminal base main body and connected to the inverter-side wiring member.

6. The terminal base according to claim 1, wherein:
the coil-side terminal is inserted in a space in the coil terminal insertion hole, on the axially inner side with respect to the first terminal; and
the internal screw is disposed in the internal screw holder in a manner such that the internal screw does not project into the intersection when the external screw is not threaded in the internal screw.

7. The terminal base according to claim 6, wherein:
the internal screw holder includes a lock that restrains movement of the internal screw to an axially outer side opposite to the axially inner side; and
the lock generates a holding force in the axial direction, the holding force being greater than a force toward the axially outer side applicable to the internal screw by a weight of the internal screw, and smaller than a force toward the axially outer side applied to the internal screw by thread engagement between the internal screw and the external screw.

\* \* \* \* \*